United States Patent [19]

Falchi

[11] 4,061,147
[45] Dec. 6, 1977

[54] COMPOSITE CIGARETTE ENVELOPING MATERIAL

[76] Inventor: Ennio Falchi, V.le di Villa Pamphili, 37/B, Rome, Italy

[21] Appl. No.: 580,469

[22] Filed: May 22, 1975

[30] Foreign Application Priority Data

May 22, 1974 Italy .................................. 51165/74

[51] Int. Cl.² ............................................ A24D 1/12
[52] U.S. Cl. ................................................ 131/4 A
[58] Field of Search ............................ 131/4 A, 15 A

[56] References Cited

U.S. PATENT DOCUMENTS

| 637,419 | 11/1889 | Richmond | 131/15 A |
| 1,020,864 | 3/1912 | Whitmore | 131/15 A |
| 3,030,963 | 4/1962 | Cohn | 131/4 A |
| 3,736,940 | 6/1973 | Saint-Pastou | 131/4 A |

FOREIGN PATENT DOCUMENTS

| 1,040,981 | 5/1953 | France | 131/15 A |

Primary Examiner—Louis G. Mancene
Assistant Examiner—Wenceslao J. Contreras
Attorney, Agent, or Firm—Cushman, Darby & Cushman

[57] ABSTRACT

A composite material for enveloping cigarette tobacco comprises an incombustible structure combined with cigarette paper, the incombustible structure consisting of a plurality of discrete sections joined together by easily detachable junction points.

5 Claims, 3 Drawing Figures

U.S. Patent
Dec. 6, 1977
4,061,147
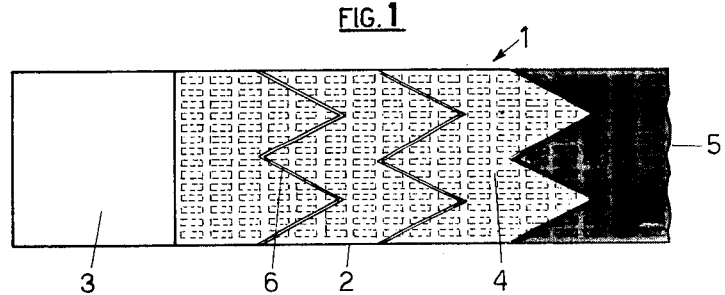
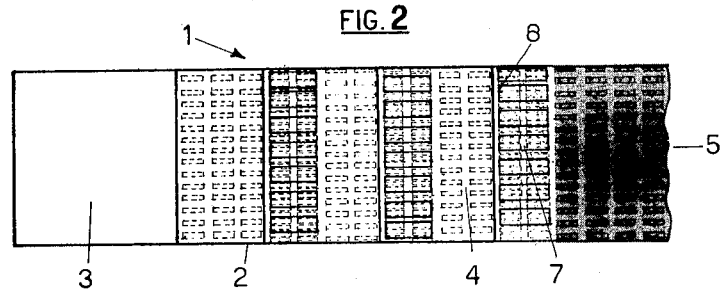
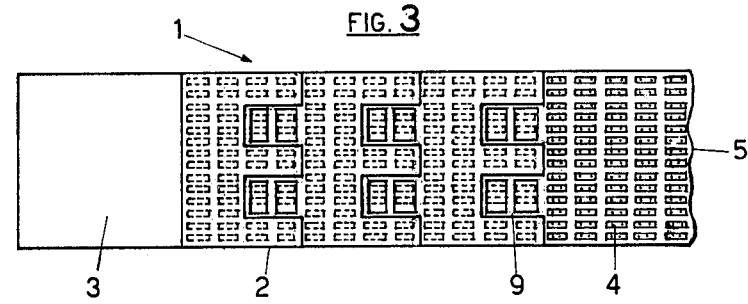

COMPOSITE CIGARETTE ENVELOPING MATERIAL

The present invention refers to a composite material for cigarette wrapping which material is capable of preventing the burning part of the cigarette from falling while it is being smoked, and further to avoid, when the cigarette is dropped, thrown away or laid down, that its burning part causes damages, since it remains retained with said composite material. The latter is divided into easily detachable sections, thereby permitting to eliminate the already smoked portions of the cigarette.

The daily chronicle reports all kinds of accidents caused by the burning ash of cigarettes which have been dropped by inadvertency or for other reasons. Burned hotels, houses, stores, woods and the like form examples of such accidents, to which must be added those which might be caused by cigarettes smoked in a motor-car and those caused to furniture, floors, clothing, carpets, etc. Furthermore, the ash which drops in a disorderly manner from cigarettes causes the soiling of rooms, clothing and the like.

There are already known composite wrapping materials for cigarettes, wherein the usual cigarette paper is combined with an incombustible structure. This structure forms a single cylinder of the same length as the cigarette paper and retains in its interior all the ashes of the cigarette tobacco.

This structure presents, however, various drawbacks of a practical and aesthetical nature, the worst being the very fact that the whole cigarette ash formed during the combustion of the cigarette is retained within the incombustible structure, which greatly impairs the pleasure of smoking.

The purpose of the present invention is to obviate said drawbacks by supplying a composite material for cigarette making which, although presenting the same form, the same taste and an identical manner of use as the traditional materials, and in addition to being endowed with particular features of safety and hygiene, results to be thoroughly agreeable to the smokers since it permits to discard sectionwise the already smoked portions of the cigarette.

The composite material according to the present invention is characterized by the fact that the structure capable of retaining the ashes and the solid combustion product consists of a plurality of sections which are divided in the longitudinal sense of the cigarette. These sections may be independent from each other or joined together by easily detachable junction points.

Said composite material consists of cigarette paper and a reticulate or perforate structure of incombustible material, which structure is fastened to the paper or incorporated into it; it is this very structure which is divided into sections in the precedently described manner and it must have adequate strength and resistance to heat and permeability to air. This incombustible structure has also the advantage of retaining part of the toxic substances contained in the tobacco and of providing a partial cooling of the inhaled smoke.

The invention also provides a procedure for the production of the composite material. This procedure will be described in the following.

The present invention will be better illustrated by the following description of examples of embodiments, made with reference to the attached drawing wherein:

FIG. 1 is an enlarged view of a cigarette made with a type of composite material according to the invention;

FIG. 2 is an enlarged view of a cigarette made with another embodiment of the composite material of the invention; and FIG. 3 is an enlarged view of a cigarette made with a further embodiment of said material.

With reference to FIG. 1, there is indicated at 1 a cigarette of conventional shape, consisting of a sheet of a composite material 2 enveloping the tobacco and of a filter 3.

Said sheet 2 consists of paper fitted with a reticular structure 4 consisting, in said embodiment, of a very thin laminar element carrying perforations of suitable size, which is made of fire-proof material, preferably a metal such as aluminum, in such a manner that, while the cigarette is smoked, the paper burns normally together with the tobacco while the reticular structure 4 of the smoked portion 5 remains unburned thereby retaining both the tobacco embers and the ashes. The reticular structure is divided into a plurality of sections, which are independent from each other and are held together by the cigarette paper. The tallying margins of the sections have a serrated conformation 6 so that, while it is easy to eliminate the single smoked portions of the cigarette, by detaching the corresponding sections, the very shape of the serrations 6 will prevent the burning ashes from falling.

In the embodiment shown in FIG. 2 the junction of the single independent sections is obtained by inserting one terminal portion of each section over the adjacent portion of the successive section, as shown at 7 in the Figure. It is obvious that when the ashes and burned paper will reach the extreme margin 8 of the overlapping part 7, the section of reticular structure corresponding to said overlapping part 7 will be easily eliminated, while the burning ash of the cigarette will be kept retained in the initial part of the successive section of reticular structure essentially corresponding to that part over which the eliminated section was placed.

In the embodiment shown in FIG. 3, the division of the single independent sections is obtained by positioning the tongues 9, which are integral with one of the terminal margins of each section, upon the adjacent terminal portion of the successive section.

Obviously each independent section may be easily discarded when the combustion of the cigarette paper will have reached the free end of the corresponding tongues 9 while the burning ashes will be retained in the initial part of the successive section. The tongues 9 may have different shapes.

As shown in the figures, the overlapping areas 7 and the tongues 9 have larger perforations, in order to make sure that these perforations will not be obstructed by the underlying smaller holes.

In the reticular structure of the invention it is not necessary that all the perforations or openings are of the same size, but it may also be convenient to vary the size of said apertures along the longitudinal axis of the reticular structure relatively to the conditions of combustion of the tobacco contained in the cigarette, and furthermore it is not necessary that the reticular structure extends over the whole surface of the cigarette. According to the invention, the incombustible structure may consist of a mesh of thin elements in lieu of a perforate foil; these elements may also be incorporated into the paper; the perforate foil may be attached to a cigarette paper which is also perforate; the whole being thereafter surrounded by imperforate paper; the imperforate paper may be fastened to the incombustible structure by an adhesive, by pressure or the like.

The procedure for producing the composite material according to the invention comprises the steps of combining a structure of incombustible material with a conventional cigarette paper. This combination may be carried out during the manufacture of the sheets from which the normal cigarette papers are successively obtained or by incorporating an incombustible mesh into the texture of said cigarette paper. Advantageously, the division of the incombustible structure into said sections is carried out simultaneously. Alternately, the incombustible structure may be manufactured separately, for instance by perforating and dividing it into sections and causing it to adhere by pressure, by an adhesive or other means to said cigarette paper. Even where this structure is incorporated into the paper, a further paper coating may be provided.

In order to facilitate the combination of the reticular and sectioned structure with the normal cigarette paper, each section of the structure might be connected to the adjacent one by easily detachable junction points.

Finally, to facilitate the manufacture of composite material forming the subject matter of the invention and the finishing of the cigarette, it is advisable to bond firstly a suitable paper to the incombustible material before the latter is perforated and divided into sections, thereafter proceed with the perforation and division of the so bonded materials and finally to combine them with the cigarette paper.

The present invention is not limited to the above described embodiments of the composite material but encompasses any possible variants thereof.

What is claimed is:

1. A composite material for enveloping cigarette tobacco comprising an incombustible structure combined with cigarette paper, wherein said incombustible structure consists of a plurality of distinct sections, wherein said distinct sections are joined together by easily detachable junction points.

2. A composite material for enveloping cigarette tobacco comprising an incombustible structure combined with cigarette paper, wherein said incombustible structure consists of a plurality of distinct sections, wherein said sections of the incombustible structure have tallying margins.

3. Composite material according to claim 2, wherein said tallying margins have a serrated conformation.

4. A composite material for enveloping cigarette tobacco comprising an incombustible structure combined with cigarette paper, wherein said incombustible structure consists of a plurality of distinct sections, wherein the margin of each terminal section overlap the adjacent margin of the successive section.

5. A composite material for enveloping cigarette tobacco comprising an incombustible structure combined with cigarette paper, wherein said incombustible structure consists of a plurality of distinct sections, wherein one of the margins of said sections is fitted with tongues overlapping the adjacent margin of the successive section.

* * * * *